United States Patent [19]

Kusaka

[11] 4,031,558
[45] June 21, 1977

[54] HEAD DRUM ASSEMBLY WITH ELECTRICAL NOISE SHIELD

[75] Inventor: Satoru Kusaka, Kawasaki, Japan
[73] Assignee: Sony Corporation, Tokyo, Japan
[22] Filed: Aug. 11, 1975
[21] Appl. No.: 603,538

[30] Foreign Application Priority Data
Aug. 27, 1974 Japan .............................. 49-98105

[52] U.S. Cl. ................................ 360/130; 360/108
[51] Int. Cl.² .................... G11B 15/60; G11B 5/52; G11B 21/04
[58] Field of Search ............................ 360/108, 130

[56] References Cited
UNITED STATES PATENTS 3,890,641  6/1975  Mo et al. ............................ 360/130

FOREIGN PATENTS OR APPLICATIONS 927,308  5/1963  United Kingdom ................ 360/108

*Primary Examiner*—Robert S. Tupper
*Attorney, Agent, or Firm*—Lewis H. Eslinger; Alvin Sinderbrand

[57] ABSTRACT

In a head drum assembly for a video tape recording and/or reproducing apparatus provided with stationary and rotary drum members for guiding a magnetic tape at their peripheries while video signals are recorded on, or reproduced from the tape by means of a magnetic head or heads carried by the rotary drum member and extending into a gap defined between the peripheral surfaces of the drum members; the rotary drum member, and hence the head or heads carried thereby, is driven by a D.C. motor disposed coaxially in respect to the drum members and having its shaft directly coupled to the rotary drum member, the signals being recorded or reproduced are transmitted by a signal transformer including nested annular stationary and rotary cores fixed to, and coaxial with the stationary and rotary drum members, respectively, and carrying confronting stationary and rotary windings which are respectively connected to signal leads extending from the stationary drum member and to the head or heads, and such signal transformer is shielded in respect to electrostatic and electromagnetic noise generated by the adjacent D.C. motor. The shielding for the signal transformer desirably includes a conductive metallic shield, for example, of a material of high magnetic permeability with a conductive metal layer or coating thereon, or of a conductive metal paint, which extends about at least the outer surface of the stationary core within which the rotary core is nested. Further, a conductive metallic shield is preferably provided on a wall of the stationary drum member which extends radially between the signal transformer and the D.C. motor and also about the latter.

11 Claims, 12 Drawing Figures

Fig. 6
Fig. 7
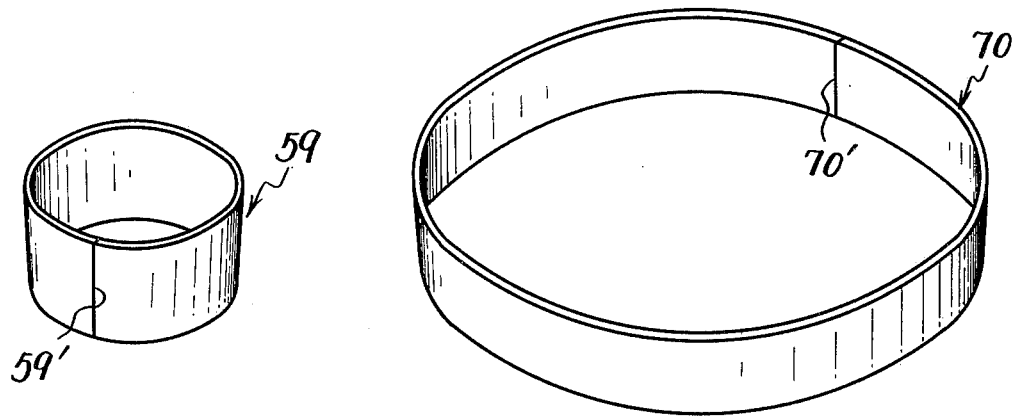
Fig. 8
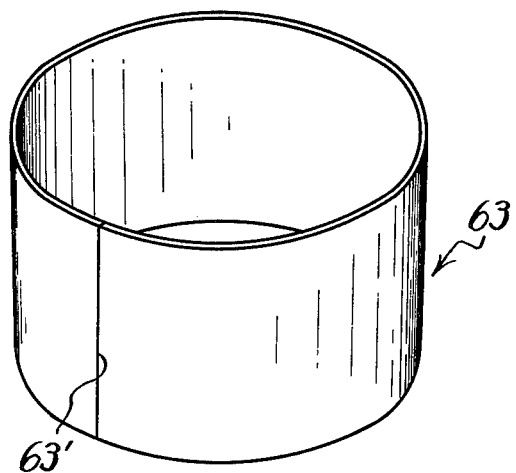
Fig. 9
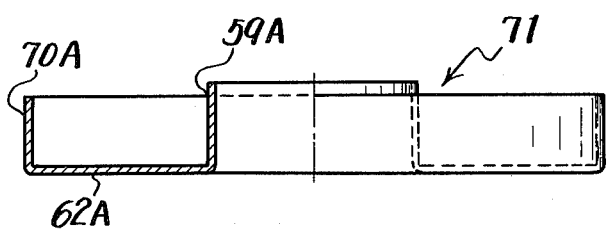

HEAD DRUM ASSEMBLY WITH ELECTRICAL NOISE SHIELD

BACKGROUND OF THE INVENTION

1. Field of the Invention

This invention relates generally to video tape recording and/or reproducing apparatus, and more particularly is directed to improvements in the head drum assembly of such apparatus by which a magnetic tape is guided during the recording or reproducing of signals on such tape by means of a rotary magnetic head or heads associated with such assembly.

2. Description of the Prior Art

In existing video tape recording and/or reproducing apparatus of the described type, the head drum assembly usually includes stationary and rotary drum members for guiding a magnetic tape at their peripheries while video signals are recorded on, or reproduced from the tape by means of a magnetic head or heads carried by the rotary drum member and extending into a gap defined between the peripheral surfaces of the drum members. The rotary drum member, and hence the magnetic head or heads carried thereby, may be driven by a D.C. motor which, in the interest of simplicity and compactness, may be disposed coaxially in respect to the drum members and have its shaft directly coupled to the rotary drum member. However, such proximate location of the driving D.C. motor to the drum members given rise to problems in respect to the signals being transmitted to and from the rotary magnetic head or heads during recording and reproducing operations, respectively. More specifically, if such transmission of the signals being recorded or reproduced is desirably effected between signals leads extending from the stationary drum member and the rotary head or heads by means of a signal transformer having stationary and rotary cores fixed coaxially to the stationary and rotary drum members and carrying respective windings for the induced transmission of the signals therebetween, such signals may be adversely affected, either electrostatically or electromagnetically, by noise generated in the proximately located D.C. motor. In the case of a conventional D.C. motor including a rotor having driving coils and a commutator engaged by brushes and through which the D.C. driving current is supplied to the driving coils, the direction of current flow in each driving coil is switched periodically by the commutator, and pulse-like currents are produced momentarily as adjacent segments of the commutator are simultaneously engaged by one or the other of the brushes. These pulse-like currents may produce corresponding pulse-like voltage on the laminated core of the rotor on which the driving coils are wound, and such pulse-like voltages or noise may be picked up by the nearby signal transformer. If an insulating sleeve, for example, of bakelite, is provided on the motor shaft to isolate the latter from the laminated core of the rotor and from the commutator, the effect on the signal transformer of the pulse-like voltages of noise transmitted by way of the motor shaft is reduced. However, it has been found that the described noise may still adversely affect the recorded or reproduced signals either electrostatically or electromagnetically, particularly as such signals are being transmitted by the signal transformer. In the case where the rotary core of the signal transformer is located within the stationary core, it has been found that electrical charges appear on the outer surface of the stationary core and such electrical charges fluctuate in response to the pulselike voltages or noise generated in the D.C. motor so that the fluctuating electrical charges influence the windings of the signal transformer and may even influence the nearby magnetic head or heads caried by the rotary drum member. Furthermore, the pulse-like voltages or noise generated in the D.C. motor may also influence the signals being carried by the signal leads which extend from the stationary drum member adjacent to the motor housing.

OBJECTS AND SUMMARY OF THE INVENTION

Accordingly, it is an object of this invention to provide a head drum assembly for a video tape recording and/or reproducing apparatus of the type in which the rotary drum member and the magnetic head or heads carried thereby are rotated by the direct coupling of such rotary drum member to the shaft of a D.C. motor, and in which noise generated by such motor cannot influence or adversely affect the signals being recorded or reproduced.

Another object is to provide a head drum assembly, as aforesaid, in which the signals being recorded or reproduced are transmitted between the rotary magnetic head or heads and signal leads extending from the stationary drum member by means of a signal transformer, and in which such signal transformer is effectively shielded from pulse-like voltages or noise generated by the D.C. motor.

A further object is to provide a head drum assembly, as aforesaid, in which noise generated in the D.C. motor is prevented from influencing the signals being recorded or reproduced as such signals are conducted through the leads extending from the stationary drum member adjacent the motor housing.

In accordance with an aspect of this invention, a head drum assembly for a video tape recording and/or reproducing apparatus comprises coaxial stationary and rotary drum members cooperating to define a peripheral guide surface for a magnetic tape with a circumferential gap in such guide surface between the stationary and rotary drum members, at least one magnetic head fixed to the rotary drum member and extending into the gap for recording and/or reproducing video signals on a magnetic tape guided by the peripheral guide surface, a D.C. motor disposed coaxially in respect to the stationary and rotary drum members and having a rotary shaft directly coupled to the rotary drum member for effecting rotation of the latter, signal transformer means including nested annular stationary and rotary cores which are fixed to, and coaxial with the stationary and rotary drum members, respectively, and adjacent stationary and rotary windings respectively mounted on the stationary and rotary cores, with the rotary winding being connected to the magnetic head or heads and the stationary winding being connected to signal leads or conducting means which extend from the stationary drum member, and shielding means for the electrostatic and electromagnetic shielding of at least the signal transformer means in respect to noise generated by the D.C. motor.

In preferred embodiments of the invention, the rotary core of the signal transformer means is disposed within the stationary core, and the shielding means includes a conductive metallic shield extending about at least the outer surface of the stationary core. Such conductive metallic shield may be constituted simply by a coating of a conductive metallic paint on the outer surface of the stationary core, or the shield may be comprised of a material of high magnetic permeability having a layer of good electrical conductivity superimposed thereon and suitably connected to ground.

Further, it is a feature of the invention to provide the shielding means on a surface of a radially directed wall of the stationary drum member which is interposed between the D.C. motor and the signal transformer means.

In accordance with still another feature of the invention, the shielding means also extends about the outer surface of the D.C. motor housing so as to prevent the noise generated in the motor from influencing the signals being conducted by the signal leads which extend from the stationary drum member adjacent the motor housing.

The above, and other subjects, features and advantages of the invention, will be apparent in the following description of illustrative embodiments of the invention which is to be read in connection with the accompanying drawings.

BRIEF DESCRIPTION OF THE DRAWINGS

FIGS. 6, 7 and 8 are perspective views of shielding members which are associated with the head drum assembly of FIGS. 1 and 2 in accordance with this invention;

FIG. 9 is a side elevational view, partly broken away and in section, of a shielding member that is employed in the head drum assembly according to another embodiment of this invention;

DESCRIPTION OF THE PREFERRED EMBODIMENTS

Figure 1:
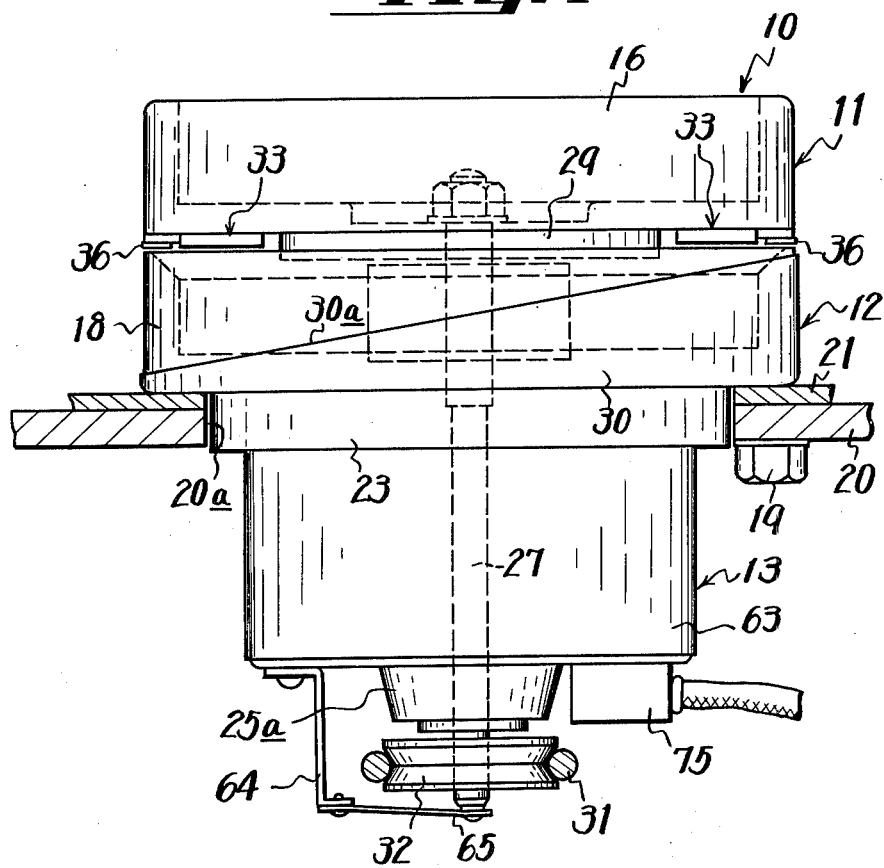
FIG. 1 is a side elevational view of a head drum assembly for a video tape recording and/or reproducing apparatus in accordance with an embodiment of this invention.
Figure 2:
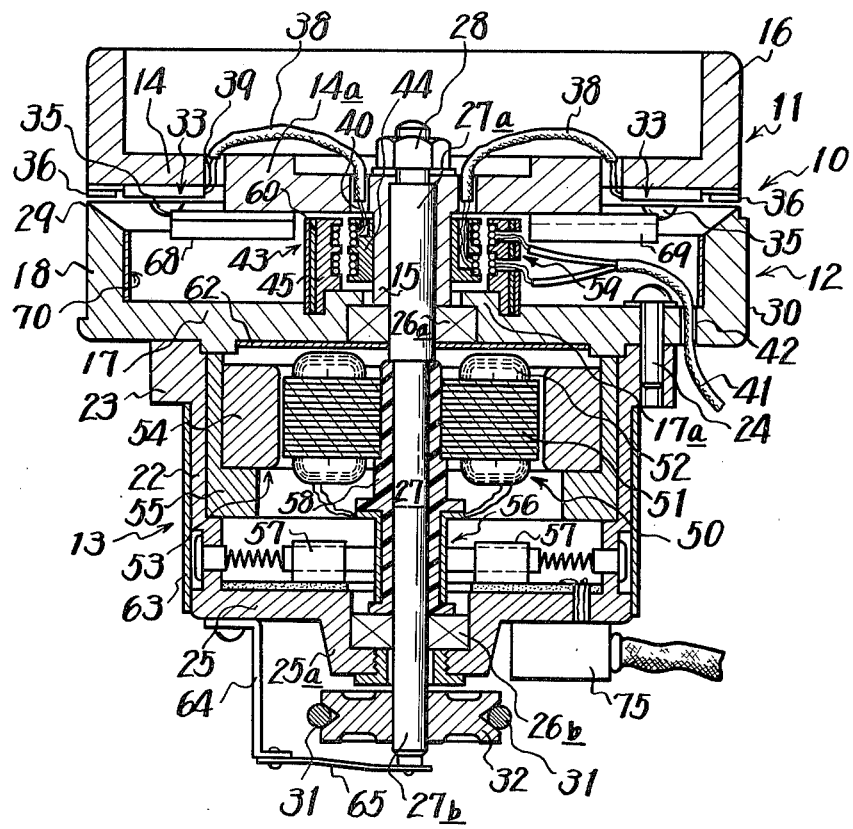
FIG. 2 is an axial sectional view of the head drum assembly shown on FIG. 1.

Referring to the drawings in detail, and initially to FIGS. 1 and 2 thereof, it will be seen that a head drum assembly 10 according to this invention may generally comprise an upper rotary drum member 11, a lower stationary drum member 12, and a D.C. motor 13 which is disposed immediately below stationary drum member 12. The upper rotary drum member 11 is preferably formed of an aluminum or other light metal alloy and includes a radially directed wall 14 having a downwardly stepped central portion 14a from which a hollow central boss or sleeve 15 depends, and an upwardly directed peripheral wall 16 extending from the outer margin of radial wall 14 (FIG. 2). The stationary lower drum member 12, which may also be formed of aluminum or other light metal alloy, includes a radially directed wall 17 and an upwardly directed peripheral wall 18 extending from the outer margin of radial wall 17. The stationary lower drum member 12 is suitably secured, as by bolts 19 (FIG. 1), on a main chassis or base plate 20 of a video tape recording and/or reproducing apparatus over a circular opening 20a in such base plate, and a suitable spacer 21 may be interposed between the underside of wall 17 and base plate 20.

The motor 13 is shown to include a generally cylindrical housing 22 which depends from stationary drum member 12 through opening 20a and which has a flange 23 at its upper end secured to the underside of wall 17 of the stationary drum member, as by screws 24 (FIG. 2). An end wall 25 is provided at the bottom of motor housing 22 and is formed with a central, hollow boss 25a. Upper and lower bearings 26a and 26b are respectively mounted in a central hollow boss 17a of wall 17 and in boss 25a of wall 25 and rotatably support a motor shaft 27. The motor shaft has an upper end portion 27a projecting upwardly from motor housing 22 and being secured in boss or sleeve 15 of rotary drum member 11, as by a nut 28 screwed on a threaded end of shaft portion 27a. Thus, rotary drum member 11 is mounted in coaxial relation to stationary drum member 12 so that the outer surfaces of peripheral walls 16 and 18 are axially spaced to define a pheripheral guide surface for a magnetic tape with a circumferential gap 29 opening at such guide surface between drum members 11 and 12. In order to direct a magnetic tape in a helical path on such guide surface, the outer surface of peripheral wall 18 of the stationary drum member may have a guide 30 suitably secured thereto and formed with an inclined upper edge 30a (FIG. 1) engageable with the lower longitudinal edge of the magnetic tape when the latter is wrapped about drum members 11 and 12.

During recording or reproducing of video signals on the tape guided in a helical path about drum members 11 and 12, the tape is conventionally advanced longitudinally, for example, by engagement with a capstan (not shown) which is driven by an elastic belt 31 (FIG. 1) extending around a pulley 32 secured on a lower end portion 27b of shaft 27 projecting downwardly from the housing of motor 13.

Figure 3:
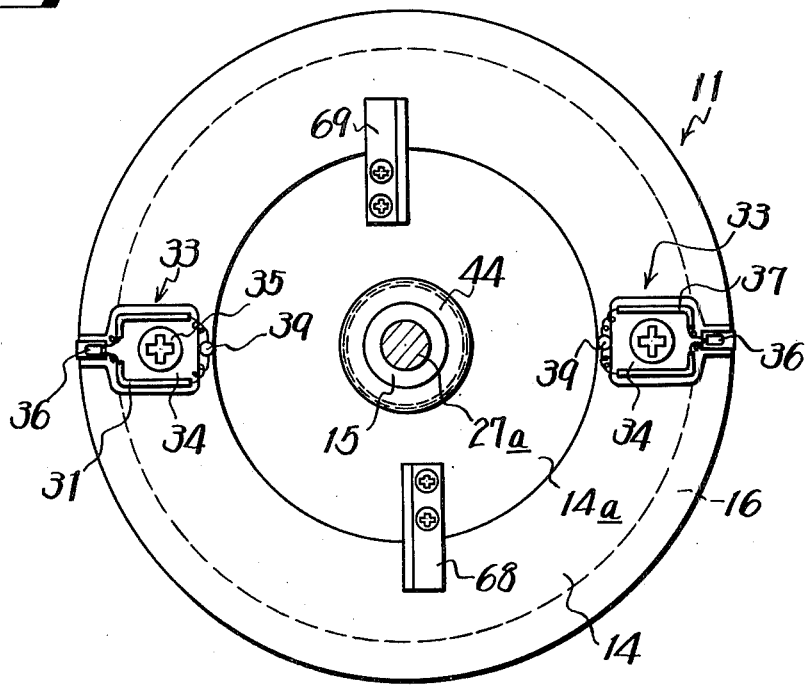
FIG. 3 is a bottom plan view of a rotary drum member included in the assembly of FIGS. 1 and 2.

The recording or reproducing of video signals is effected in oblique tracks on the magnetic tape by means of one or more magnetic head assemblies 33 which are carried by rotary drum member 11 so as to act on the tape through circumferential gap 29. As shown on FIG. 3, the head drum assembly 10 according to this invention may have two diametrically opposed head assemblies 33 each of which includes a head holder 34 secured, as by a screw 35, to the underside of the radial wall 14 of drum member 11 and carrying a head chip 36 which extends outwardly from the respective holder 34 into gap 29. In order to transmit the video signals to and from the chips 36 of head assemblies 33 while the latter rotate with drum member 11 during recording or reproducing operations, each head holder 34 may have leads 37 printed thereon for connecting the respective head chip 36 to wires 38 which extend upwardly through an adjacent hole 39 in wall 14 and then are directed inwardly over such wall for passage downwardly through another hole 40 in the central wall portion 14a adjacent boss 15. The signals being recorded or reproduced are further transmitted between leads or wires 38 rotating with drum member 11 and leads or wires 41 (FIGS. 2 and 4) which extend out of stationary drum member 12 through a passage 42 in wall 17 by means of a signal transformer 43.

Figure 5:
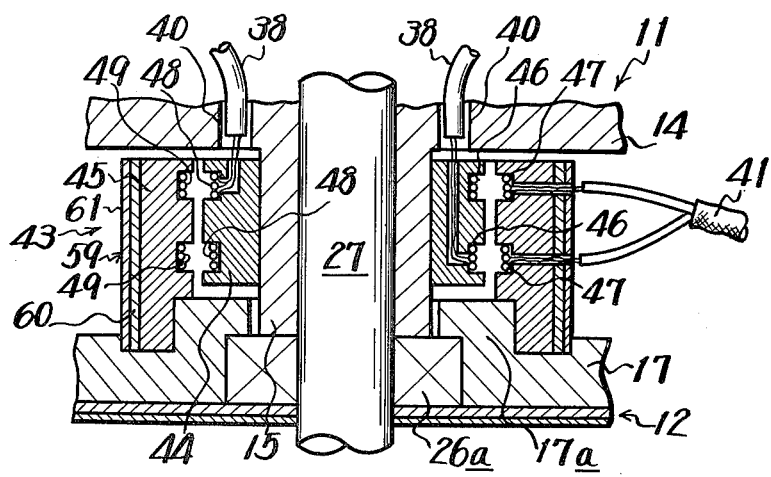
FIG. 5 is an enlarged, fragmentary sectional view showing details of a signal transformer employed in the head drum assembly of FIGS. 1 and 2.

As shown particularly on FIG. 5, the signal transformer 43 may include an annular rotary core 44, for example, of ferrite, extending about, and secured to the boss 15 of rotary drum member 11 for rotation with the latter, and an annular stationary core 45 which may also be of ferrite and which extends upwardly from wall 17 of stationary drum member 12 so as to nest rotary core 44 within stationary core 45 with radial clearance therebetween. The confronting cylindrical surfaces of cores 44 and 45 are shown to be formed with paired circumferential grooves 46 and 47, respectively, and rotary and stationary windings 48 and 49 are respectively disposed in such grooves 46 and 47. Each of the rotary windings 48 on core 44 is suitably connected to the leads 38 extending from the respective head assembly 33, while each of the stationary windings 49 on core 45 is suitably connected to the leads 41 extending out of stationary drum member 12. It will be apparent that, during a recording operation, signals to be recorded are supplied by way of leads 41 to windings 49 and induce corresponding signals in the adjacent windings 49 for transmission from the latter by way of leads 38 to the respective head assemblies 33 for recording by the latter on a magnetic tape. Conversely, during a reproducing operation, the signals reproduced from the tape by the head assemblies 33 are supplied by way of leads 38 to the respective windings 48 for inducing corresponding signals in the adjacent windings 49, whereupon such induced signals are transmitted from the head drum assembly 10 by way of leads 41.

Referring again to FIG. 2, it will be seen that the D.C. motor 13 may conventionally include a rotor 50 having a laminated core 51 secured to shaft 27 and driving coils 52 wound on core 51, and a stator 53 having a magnet ring 54 within a holding annulus 55 which is suitably secured within motor housing 22. Motor 13 is further shown to comprise a commutator 56 also secured on shaft 27 below rotor 50 and having its several commutator segments electrically connected to the respective driving coils 52, and brush assemblies 57 mounted on lower end wall 25 of the motor housing and being engageable with commutator 56 for supplying D.C. power to driving coils 52 by way of the commutator. Preferably, as shown, an insulating sleeve 58, for example, of bakelite, is secured on shaft 27 so as to isolate the commutator 56 and the laminated core 51 of rotor 50 from the motor shaft.

As is known, during operation of D.C. motor 13, the direction of current flow in each of driving coils 52 is switched periodically by the commutator 56, and pulse-like currents are produced momentarily as adjacent segments of the commutator are simultaneously engaged by one or the other of the brush assemblies 57. These pulse-like currents may produce corresponding pulse-like voltages on the laminated core 51 of the rotor. Therefore, although the direct coupling of rotary drum member 11 to the shaft 27 of motor 13 results in a desirably compact and simple assembly, the above-mentioned pulse-like voltages or noise produced in D.C. motor 13 may be picked up by the nearby signal transformer 43 which is desirably employed for transmitting signals to and from head assemblies 33 during recording and reproducing operations. Although the insulating sleeve 58 for isolating the laminated core 51 and commutator 56 from shaft 27 serves to reduce the effect on signal transformer 43 of the pulse-like voltages or noise that would otherwise be transmitted by way of motor shaft 27, it has been found that the described motor noise may still adversely affect the recorded or reproduced signals, either electrostatically or electromagnetically, particularly as such signals are being transmitted by signal transformer 43. More specifically, it has been found that electrical charges appear on the outer surface of the outer core of transformer 43, that is, the stationary core 45, and that such electrical charges fluctuate in response to the pulse-like voltages or noise generated in motor 13 so that the fluctuating electrical charges influence the windings 48 and 49 of the signal transformer and may even influence the nearby magnetic head assemblies 33 carried by rotary drum member 11. Further, the pulse-like voltages or noise generated in D.C. motor 13 may also influence the signals being carried by the leads 41 which extend from stationary drum member 12 adjacent to motor housing 22.

In accordance with the present invention, the electrostatic and/or electromagnetic effects of the pulse-like voltages or noise of motor 13 on signal transformer 43 of head drum assembly 10 are eliminated, or at least very substantially minimized, by providing the outer surface of stationary core 45 with an annular shield 59 extending thereabout. As shown on FIG. 5, such annular shield 59 may be comprised of a strip of a material having high magnetic permeability, for example, permalloy, which is longitudinally curved and has its ends joined together, as at 59' on FIG. 6, to form a ring 60 dimensioned to extend about stationary core 45. Further, a layer 61 of copper or other material having good electrical conductivity is laminated, plated or vapor deposited on the surface of the permalloy ring 60. As is shown on FIG. 5, such copper layer 61 is in electrical contact with wall 17 of stationary drum member 12 which is, in turn, in electrical contact with the suitably grounded base plate or chassis 20 of the recording and/or reproducing apparatus. By reason of shield 59 extending about signal transformer 43, any electrical charge that would otherwise form on the outer surface of stationary core 45 is discharged to ground so as to substantially eliminate any electrostatic effects of the pulse-like voltages or noise generated in motor 13 on signal transformer 43 or on adjacent head assemblies 33. Furthermore, shield 59, particularly when formed at least in part of a material having high magnetic permeability, as described above, is effective to shield signal transformer 43 from the electromagnetic effects of the noise produced by motor 13 or leaked magnetic flux from the latter, and which may act on signal transformer 43 from outside the stationary core 45.

In order to ensure that the noise produced by motor 13 and magnetic flux leaked therefrom will not exert either an electrostatic or electromagnetic effect on signal transformer 43 in the direction from below the latter, a surface of radial wall 17 of the stationary drum member has a shield member 62 (FIG. 2) disposed thereagainst. Such shield member 62 is desirably formed of a material similar to that used for the shield member 59, that is, of a material having a high magnetic permeability to which a layer of copper or the like having good electrical conductivity is applied. In the illustrated head drum assembly 10, the shield member 62 is shown to be in the form of a disk applied against the lower surface of radial wall 17 so as to be axially interposed between laminated core 51 of the motor rotor and signal transformer 43.

Since the leads 41 which carry the signals to and from transformer 43 extend from stationary drum member 12 adjacent motor housing 22, the pulse-like voltages or noise generated by D.C. motor 13 may also exert electromagnetic and/or electrostatic effects on such leads 42. In order to avoid the foregoing, head drum assembly 10 is further shown to be provided with a cylindrical shield member 63 which extends about the outer surface of motor housing 22 (FIGS. 1 and 2). The shield member 63 may be formed similarly to the shield 59, that is, produced from a relatively wide strip of permalloy or other material having high magnetic permeability, which strip is suitably curved and has its ends joined together, as at 63' on FIG. 8, whereupon a layer of copper or other material having good conductivity is deposited on its outer surface. The conductive layer on shield member 63 is connected to ground, for example, through a suitably grounded bracket or holder 64 which supports a contact shoe 65 engaging the lower end of shaft 27 (FIG. 2) for ensuring that any electric charge on shaft 27, for example, occurring by reason of the engagement of elastic belt 31 with pulley 32 or otherwise, will be directly discharged to ground. Further, the insulating sleeve 58, previously described as being formed of bakelite, may be formed of the latter material laminated with copper so as to promote the shielding effects thereof.

Figure 4:
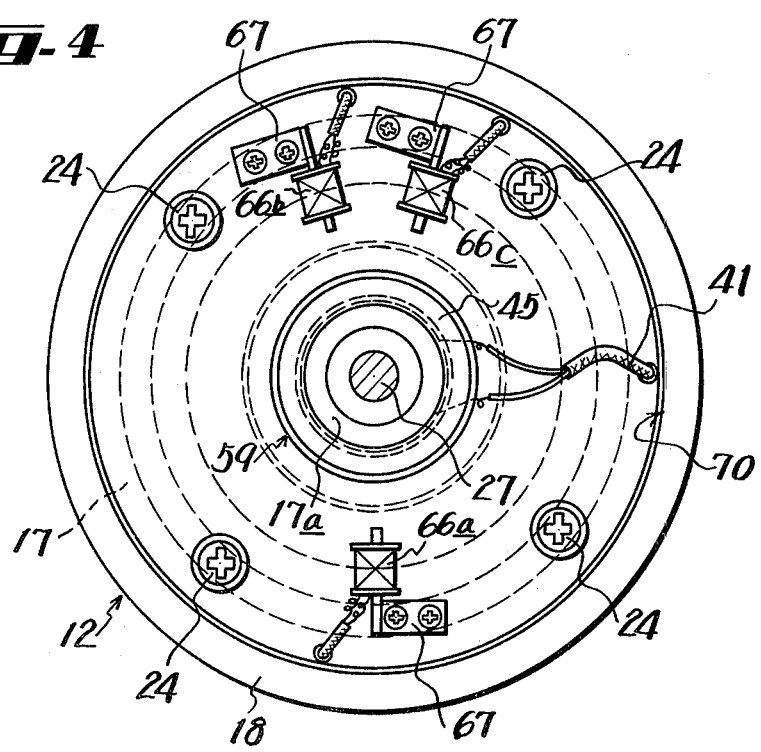
FIG. 4 is a top plan view of a stationary drum member included in the assembly of FIGS. 1 and 2.

As is shown particularly on FIG. 4, head drum asemblies of the type to which this invention relates are frequently provided with one or more pulse-generators which detect the rotational positions of head assemblies 33, for example, so as to provide reference pulses or signals by which the rotation of head assemblies 33 with rotary drum member 11 can be synchronized in respect to the video signals being recorded or reproduced so as to ensure that each of head assemblies 33 will scan an oblique record track on the magnetic tape during a respective field of the video signal. In the illustrated drum assembly 10, such pulse generators are shown to include coils 66a, 66b and 66c (FIG. 4) mounted on respective brackets 67 which are suitably spaced apart on the upper surface of radial wall 17 of the stationary drum member so as to be successively influenced by a magnetic member 68 (FIG. 3) which depends from radial wall 14 of rotary drum member 11 for rotation with the latter. If desired, dynamic balance of rotary drum member 11 may be maintained by providing a non-magnetic member 69 (FIG. 3), for example, of brass, which is mounted on the underside of wall 14 at a diametrically opposed location to magnetic member 68 and which is dimensioned to have a suitable mass for dynamically balancing the member 68. As magnetic member 68 rotates with drum member 11 so as to move past coils 68a–68c in succession, such coils are influenced by the proximity of magnetic member 68 to provide corresponding pulse signals. In order to ensure that such pulse signals will not have an electromagnetic or electrostatic effect on the magnetic tape guided on the peripheral surfaces of drum members 11 and 12, head drum assembly 10 according to this invention, may further preferably have a shield member 70 which covers the inner surface of peripheral wall 18 of the stationary drum member. Such shield member 70 may be formed similarly to shield 59, that is, of an elongated strip of a material of high magnetic permeability which is bent or curved longitudinally and has its ends joined, as at 70' on FIG. 7, to form a ring dimensioned to fit within peripheral wall 18 which has its surface coated with a layer of copper or other material of good electrical conductivity.

In the above described head drum assembly 10, the shield members 59, 62 and 70 are separately formed and secured in their respective positions. However, as shown on FIG. 9, such shield members 59, 62 and 70 may be replaced by a single shield member 71 of annular configuration having a bottom, radially directed portion 62A in the form of a ring with flanges 59A and 70A directed upwardly along the inner and outer margins, respectively, of the bottom portion. The entire shield member 71 may again be formed of permalloy or other material having high magnetic permeability with a coating or layer thereon of copper or other material having good electrical conductivity. Such shield member 71 is dimensioned so that its bottom portion 62A will extend over the upper surface of radial wall 17 of the stationary drum member 12 to perform the functions of the previously described shield member 52, while the flanges 59A and 70A will respectively extend about stationary core 45 of signal transformer 43 and cover the inner surface of peripheral wall 18 so as to perform the previously described functions of shield 59 and shield member 70, respectively.

Figure 10:
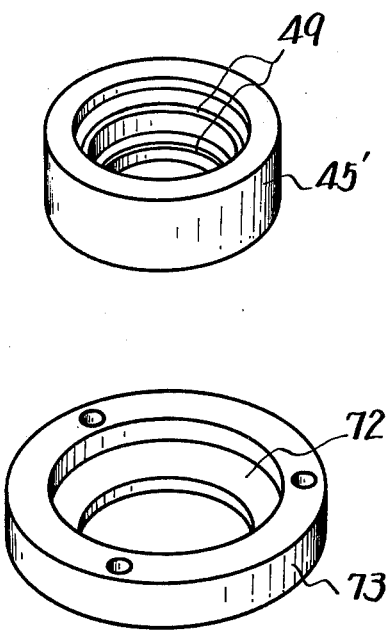
FIG. 10 is an exploded perspective view of portions of a signal transformer employed in a head drum assembly according to still another embodiment of this invention.
Figure 11:
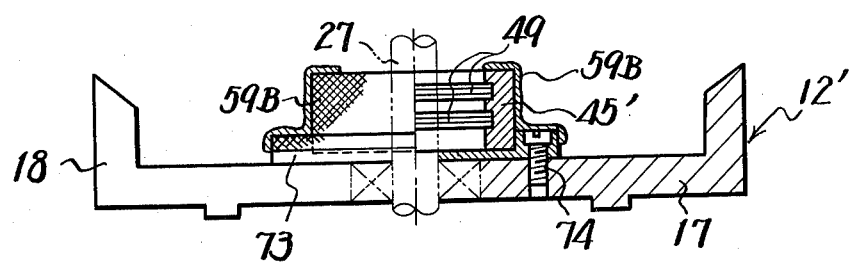
FIG. 11 is a side elevational view, partly broken away and in section, and showing the shielding provided according to this invention in association with the portions of the signal transformer illustrated by FIG. 10.

Referring now to FIGS. 10 and 11, it will be seen that, in a head drum assembly according to another embodiment of this invention which is otherwise similar to the previously described assembly 10, the stationary core 45 of signal transformer 43 which is directly mounted on wall 17 of the stationary drum member 12 may be replaced by a similar stationary core 45' received in an annular recess 72 of a holder or ring 73 of aluminum or other conductive material secured, as by screws 74 (FIG. 11) on the top surface of wall 17 so as to position fixed core 45' about the associated rotary core (not shown). In this case, the shield 59B which corresponds to the previously described shield 59 may be constituted by a conductive layer, for example, of silver paint, which extends continuously over the outer surface of stationary core 45' and the contiguous surface of ring or holder 73 so that any electrical charge that would otherwise form on the outer surface of stationary core 45' is discharged by the conductive layer 59B and conductive holder 73 to the grounded stationary drum member 17. Although only the shield 59B is shown on FIG. 11, it is to be understood that such shield is preferably employed in association with the shield members 62, 63 and 70 described above with reference to FIG. 1.

Figure 12:
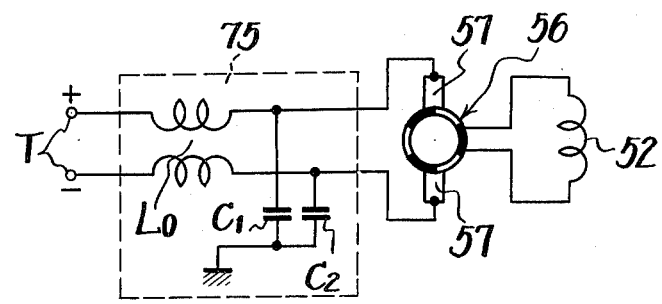
FIG. 12 is a wiring diagram illustrating a noise filter that is preferably interposed in the circuit by which the D.C. motor of the head drum assembly according to this invention is connected to a power source for energizing of the motor.

As shown on FIG. 12, the circuit for energizing the D.C. motor 13 of a head drum assembly according to this invention is preferably provided with a noise filter 75 interposed between the terminals T of a suitable D.C. power source and the brush assemblies 57 for isolating the high frequency noises produced by the motor from such power source. For example, as shown, the noise filter 75 may include a bi-filor coil $L_0$ connected between the power source terminals T and the brush assemblies 57 and bi-pass capacitors $C_1$ and $C_2$ connected between the brush assemblies and ground.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A head drum assembly for a video tape transport apparatus, a grounded stationary drum member; a rotary drum member coaxial with said stationary drum member and cooperating with the latter to define a peripheral guide surface for a magnetic tape with a circumferential gap in said guide surface between said stationary and rotary drum members; at least one magnetic head fixed to said rotary drum member and extending into said gap for transducing video signals on a magnetic tape guided by said peripheral guide surface; a D.C. motor disposed coaxially in respect to said stationary and rotary drum members and having a rotary shaft directly coupled to said rotary drum member for effecting rotation of the latter; signal transformer means including nested annular outer stationary and inner rotary cores which are fixed to, and coaxial with said stationary and rotary drum members, respectively, and adjacent stationary and rotary windings mounted on said stationary and rotary cores, respectively; means connecting said magnetic head to said rotary winding; signal conducting means connected to said stationary winding; and shielding means comprising a material of high magnetic permeability extending around said outer surface of said stationary core and having a layer of good electrical conductivity superimposed on said high permeability material and electrically connected to said grounded stationary drum member for shielding said signal transformer means from electrical signals noise generated by said D.C. motor.

2. A head drum assembly according to claim 1, in which said conductive metallic shield is constituted by a coating of conductive metallic paint on said outer surface of the stationary core and having an electrical connection to said stationary drum member which is grounded.

3. A head drum assembly according to claim 1; in which said grounded stationary drum member includes a radially directed wall from which said stationary core extends about said rotary core at the side of said wall facing toward said rotary drum member; said motor includes a housing mounted on said wall at the opposite side of the latter and containing a rotor fixed to said shaft and a stator extending about said rotor; and said shielding means extends about the outer surface of said stationary core and on a surface of said radially directed wall.

4. A head drum assembly according to claim 3; in which said rotor includes a laminated core and a driving coil wound on said laminated core; said motor further includes a commutator rotatable with said rotor and connected with said driving coil, and a brush assembly mounted within said housing and engaging said commutator for supplying D.C. current to said driving coil; an insulating sleeve is provided on said shaft between the latter and said commutator and rotor; and grounding means for grounding said shaft.

5. A head drum assembly according to claim 3; in which said signal conducting means extends out of said stationary drum member through said wall of the latter at the outside of said housing of the motor; and said shielding means further extends about the outer surface of said housing of the motor for shielding said signal conducting means in respect to said electrostatic and electromagnetic noise.

6. A head drum assembly according to claim 5; in which said shielding means is comprised of a material of high magnetic permeability having a layer of good electrical conductivity superposed on said material.

7. A head drum assembly according to claim 6; in which said material of high magnetic permeability is permalloy and said layer superposed thereon is of copper.

8. A head drum assembly according to claim 3; in which said stationary drum member further includes a circumferential wall directed axially toward said rotary drum member from the periphery of said radially directed wall; and shielding means further covers the inner surface of said circumferential wall.

9. A head drum assembly according to claim 8; further comprising pulse generating means mounted on said radially directed wall of the stationary drum member between said stationary core and said circumferential wall.

10. A head drum assembly according to claim 8; in which said shielding means is constituted by an annular shielding member having a radially directed portion extending across said radially directed wall of the stationary drum member and inner and outer axially directed flanges which respectively extend about said stationary core and cover said inner surface of the circumferential wall.

11. A head drum assembly according to claim 10; in which said shielding member is formed of a material of high magnetic permeability having a layer of good electrical conductivity thereon.

* * * * *